US008319140B2

(12) United States Patent
Stieglbauer et al.

(10) Patent No.: US 8,319,140 B2
(45) Date of Patent: Nov. 27, 2012

(54) SPOT WELDING GUN FOR RESISTANCE WELDING OF WORKPIECES

(75) Inventors: Walter Stieglbauer, Manning (AT); Guenter Weigerstorfer, Sipbachzell (AT)

(73) Assignee: Fronius International GmbH, Pettenbach (AT)

( * ) Notice: Subject to any disclaimer, the term of this patent is extended or adjusted under 35 U.S.C. 154(b) by 70 days.

(21) Appl. No.: 12/928,002

(22) Filed: Dec. 1, 2010

(65) Prior Publication Data
US 2011/0073571 A1  Mar. 31, 2011

Related U.S. Application Data

(62) Division of application No. 10/580,375, filed as application No. PCT/AT2004/000410 on Nov. 24, 2004, now Pat. No. 7,858,896.

(30) Foreign Application Priority Data

Nov. 25, 2003 (AT) ................. A 1887/2003

(51) Int. Cl.
*B23K 11/30* (2006.01)
*B23K 9/28* (2006.01)
(52) U.S. Cl. .................... 219/119; 219/86.1; 219/90
(58) Field of Classification Search ............... 219/86.25, 219/109, 119, 86.1, 90, 78.01, 92, 86.51, 219/84, 57, 101, 86.32, 86.33
See application file for complete search history.

(56) References Cited

U.S. PATENT DOCUMENTS

| 3,015,713 | A | | 1/1962 | Eckler et al. | |
|---|---|---|---|---|---|
| 4,481,401 | A | | 11/1984 | Humblot | |
| 5,961,854 | A | * | 10/1999 | Mueller et al. | 219/119 |
| 6,911,616 | B2 | | 6/2005 | Kilabarda et al. | |
| 7,012,213 | B2 | * | 3/2006 | Jeon | 219/119 |
| 2003/0183602 | A1 | * | 10/2003 | Hughes | 219/92 |

FOREIGN PATENT DOCUMENTS

| DE | 44 16 504 | 11/1995 |
|---|---|---|
| DE | 197 54 546 | 6/1999 |
| DE | 102 21 905 | 3/2003 |
| EP | 1 352 700 | 10/2003 |
| GB | 571401 | 8/1945 |

(Continued)

OTHER PUBLICATIONS

International Search Report of PCT/AT2004/000410.

(Continued)

*Primary Examiner* — Henry Yuen
*Assistant Examiner* — Hung D Nguyen
(74) *Attorney, Agent, or Firm* — Collard & Roe, P.C.

(57) ABSTRACT

A spot welding gun for resistance welding of workpieces, includes a base body and a bracket, in which electrode holders are arranged, the electrodes being in turn arranged in the holders. At least one electrode holder is fixed to an actuator that enables the electrode holder fixed thereto with the electrode to be displaced in longitudinal direction towards other electrodes. To protect the electrodes, a winding device with a band is arranged, the band being displaceably arranged between the contact surface of the electrode and the workpiece opposite the electrode. The winding device assigned to the displaceable electrode is connected to the displaceable electrode so that it moves at the same time as the electrode when the electrode is moved in longitudinal direction. The electrode holders and the electrodes have devices for guiding the band from the winding device axially along the electrode holders towards the electrode and vice versa.

18 Claims, 6 Drawing Sheets

FOREIGN PATENT DOCUMENTS

| | | |
|---|---|---|
| JP | 55 141 387 | 11/1980 |
| JP | 61-27580 | 2/1986 |
| JP | 63-41373 | 3/1988 |
| JP | 4 322 886 | 11/1992 |
| JP | 5-53782 | 7/1993 |
| JP | 5 192 774 | 8/1993 |
| JP | 8 118 037 | 5/1996 |
| JP | 8 206 844 | 8/1996 |
| JP | 10 029 071 | 2/1998 |
| JP | 2002-263847 | 9/2002 |

OTHER PUBLICATIONS

English translation of Japanese Office Action dated Aug. 3, 2010.
English translation of Chinese Office Action.

* cited by examiner

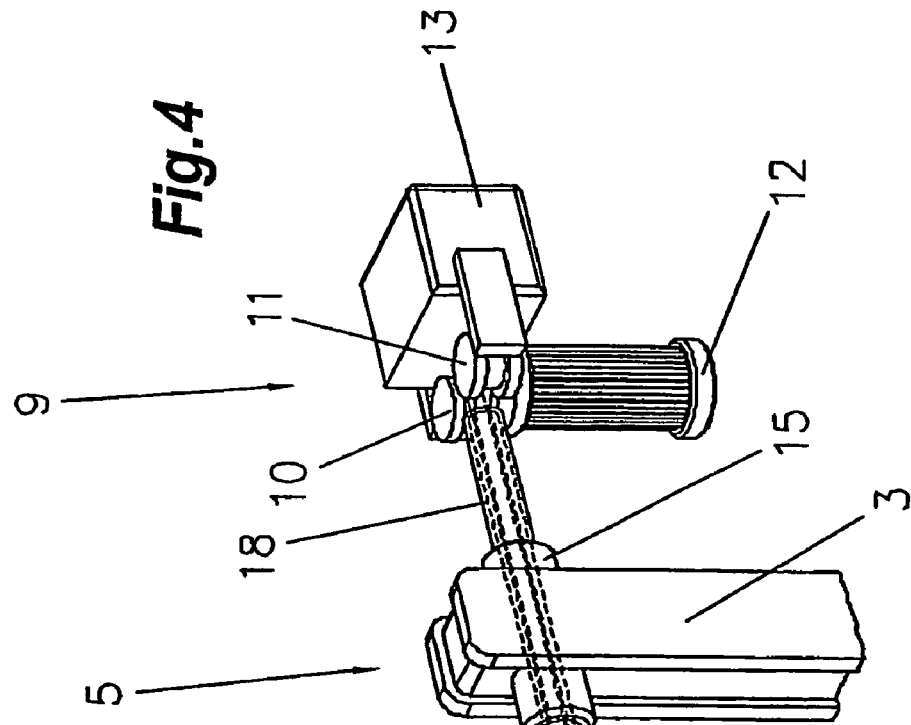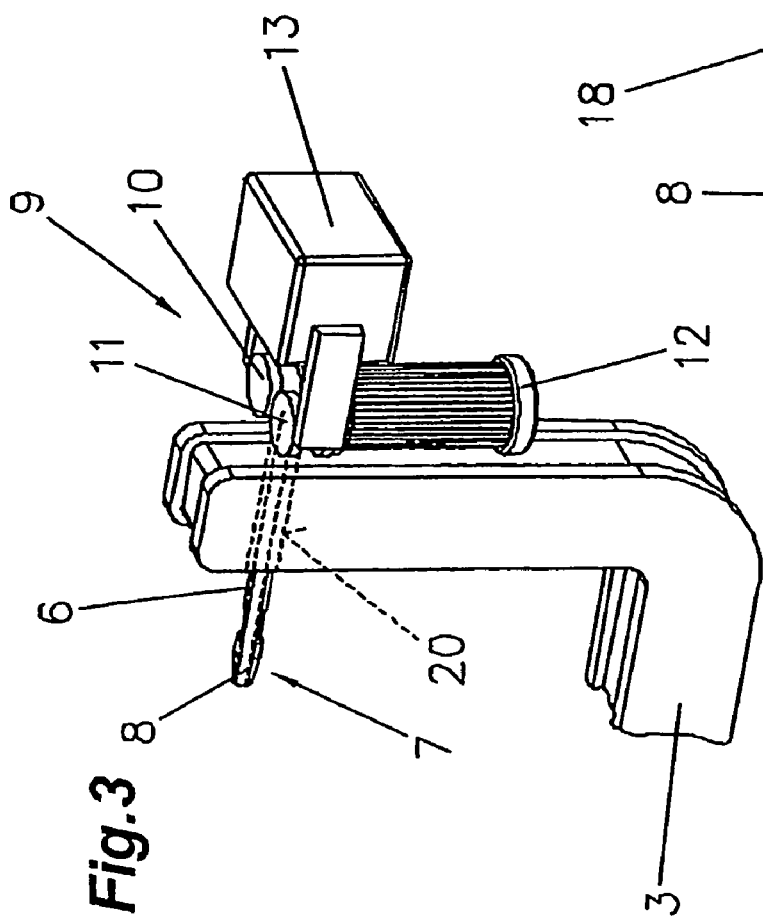

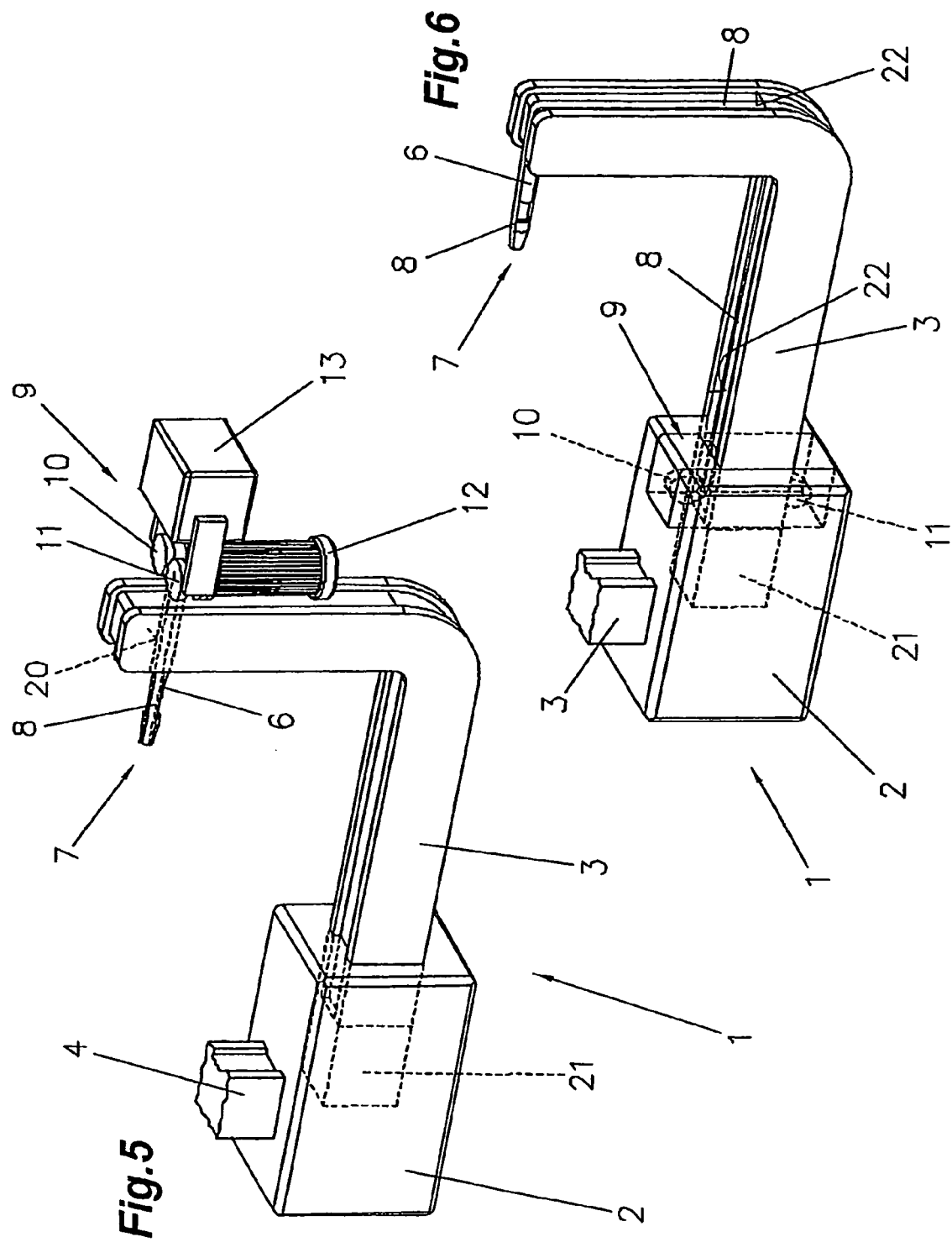

SPOT WELDING GUN FOR RESISTANCE WELDING OF WORKPIECES

CROSS REFERENCE TO RELATED APPLICATIONS

This application is a divisional of and Applicants claim priority under 35 U.S.C. §§120 and 121 of U.S. application Ser. No. 10/580,375 filed on May 23, 2006, which application is a national stage application under 35 U.S.C. §371 of PCT Application No. PCT/AT2004/000410 filed Nov. 24, 2004 which claims priority under 35 U.S.C. §119 from Austrian Patent Application No. A 1887/2003 filed Nov. 25, 2003, the disclosures of each of which are hereby incorporated by reference.

BACKGROUND OF THE INVENTION

1. Field of the Invention

The invention relates to a spot welding gun for the resistance welding of workpieces, including a base body and a bracket on which electrode holders carrying electrodes are arranged, wherein at least one electrode holder is fastened to an actuating means via which the electrode holder fastened thereto is displaceable together with one of said electrodes in the longitudinal direction to a further one of said electrodes, wherein a winding device including a strip is each provided for the protection of the electrodes, which strip is arranged to be displaceable relative to the electrode between the contact surface of the electrode and the workpiece, and wherein the winding device associated with the displaceable electrode is connected with the displaceable electrode so as to follow a longitudinal movement of said electrode.

The described spot welding gun is, in particular, suited to robotic applications in the resistance welding of workpieces particularly of the sheet-metal type.

At present, sheet metals or other workpieces made of aluminum alloys and magnesium as well as zinc-coated or coated steel sheets—partially in high-strength quality—are used to an increasing extent, for instance, in the car body making industry. Apart from advantages such as weight saving and good corrosion resistance, these materials or their coatings give rise to problems during joining by resistance spot welding. Above all, the tool life quality of the employed spot welding electrodes, which is strongly reduced as compared to bright steel sheet, has adverse effects. The high wear of the electrodes entails high costs due to the frequent reworking of the electrode contact surfaces and the frequent electrode exchanges resulting therefrom as well as a reduced welding quality, particularly prior to such electrode reworking or prior to an electrode exchange.

2. The Prior Art

Various spot welding guns and, in particular, so-called "C guns", in which the components of the spot welding gun have C-shaped configurations, are known from the prior art, yet not in combination with a circulating strip that protects the electrode from soiling.

From DE 102 21 905 A1, a welding gun including a gun compensation and a method for compensating the welding gun are known. Pneumatic or hydraulic drives, servo drive systems including gears or even controllable electromagnets are used for welding gun compensation.

The disadvantage of that spot welding gun and method resides in that the electrode, as already described in the introductory part, during spot welding is in direct contact with the workpieces or sheet metals to be welded and, hence, subjected to high wear. Consequently, frequent reworking or electrode replacement is required, for which reason frequent production stops of the spot welding guns have to be taken into account.

In order to protect an electrode from being soiled or coated by the materials to be welded, it is known to insert a metal foil in strip-form between the electrode and the workpiece. In order to ensure safe strip feeding, it is necessary to prevent the strip from adhering to the contact surface of the electrode.

From DE 197 54 546 C1, a spot welding tool including a winding device for winding on and off a foil strip transversely contacting the electrode tip of the spot welding electrode is known. The spot welding tool is equipped with an annular wind-off coil for winding off the foil strip and an annular wind-up coil for winding up the foil strip, and comprises an annular driving means for the cyclical rotation of the wind-up coil. The wind-off coil, the wind-up coil and the driving means are adjacently arranged coaxially with one another around the electrode shaft or electrode holder of the spot welding electrode. A first setting roller is arranged obliquely to the electrode shaft and at a radial distance from the wind-off coil to deflect the foil strip from the wind-off coil towards the electrode tip and place it in a transverse position. Furthermore, a second setting roller is arranged obliquely to the electrode shaft and at a radial distance from the wind-up coil to deflect the foil strip from the electrode tip towards the wind-up coil and place it in a transverse position, wherein the two setting rollers are arranged in an opposed relationship laterally of the electrode shaft.

A similar configuration is known from JP 05 192 774 A, in which the wind-up and wind-off coils are likewise arranged on the electrode shaft or electrode holder, respectively.

The previously mentioned configurations according to DE 197 54 546 C1 and JP 05 192 774 A involve the disadvantage of the accessibility of the spot welding tool being strongly limited because of the arrangement of the wind-up and wind-off coils in the region of the electrode shaft or electrode holder, thus calling for a substantial enlargement of the spot welding gun in the end region and, in particular, in the welding zone. Hence, a substantially larger design of a thus configured C gun would have to be provided, which would entail a considerable increase in weight and, as a result, require the use of substantially larger-dimensioned robots. As a result, only easily accessible workpieces can be spot-welded by a spot welding tool of this type, in particular when using a C gun.

Applications of strips for the protection of electrodes in spot welding processes are further known from JP 10 029 071 A, JP 08 118 037 A, JP 04 322 886 A or JP 05 192 774 A. In those spot welding tools, the strip, which is supplied and carried off via a winding device, is positioned above the electrode, likewise as a protection against a contact of the electrode with the workpiece or structural component, so that the strip will come to lie at the workpiece or structural component during a spot welding process. The wind-up and wind-off coils in that case are arranged and fixed independently of the spot welding tool.

This involves the drawback of requiring plenty of space so as to render direct applications feasible with flat workpieces only. The use of a C gun in the automated field, particularly with robots, is not possible.

GB 571 401 A relates to an electrode assembly for a spot welding gun using a thin protection strip of copper for the protection of the electrode, which is displaceably arranged between the contact surface of the electrode and the workpiece. The winding device together with the electrode protection strip is arranged on the movable electrode holder so as to participate in the longitudinal movement of the electrode. The construction according to GB 571 401 A involves the drawback that the strip guidance laterally of the electrode occupies a large space such that the application of the welding apparatus is feasible with flat workpieces only. The accessibility is largely affected by the electrode protection strip. Moreover, the components used to guide the strip have relatively complex structures.

JP 55 141 387 A discloses a spot welding gun in which a winding device for an electrode protection strip is likewise arranged on the electrode holder. In that construction too, the strip guidance requires a relatively large space, which has adverse effects on the accessibility. The use of the spot welding gun for welding workpieces having complex geometries is, therefore, not possible.

SUMMARY OF THE INVENTION

The object of the present invention consequently resides in providing a spot welding gun, in particular a C gun, for robotic applications for the resistance welding of workpieces, with which the accessibility is not substantially impaired and a very simple and compact structure including an electrode protection strip is feasible.

This object is achieved in that the electrode holders and the electrodes comprise means for guiding the strip from the winding device axially along the electrode holder to the electrode and again axially along the electrode holder back to the winding device. This special arrangement and guidance of the strip provides for a compact structure of the spot welding gun without limiting the accessibility to the spot welding gun comprising an arranged strip relative to commercially available spot welding guns having no strips.

It is, thus, ensured in an advantageous manner that a substantially simplified exchange of the winding device as well as the threading in and out of the strip are provided by the arrangement of the winding device on the base body or even on the bracket and on the actuating element. In addition, it is feasible through the use of the strip for the protection of the electrode, to employ a commercially available electrode without reducing the number of weld spots. By the special arrangement and guidance of the strip, a compact structure of the C gun is reached without limiting the accessibility of the C gun comprising the arranged strip relative to a commercially available C gun having no strip.

Another advantageous configuration provides a simple and cost-effective embodiment of the winding device.

The configuration according to another embodiment is of advantage, since the winding device is thereby caused to follow the longitudinal movement or longitudinal displacement of the electrode relative to the workpieces or sheet metals. Thus, the strip need not be loosened to follow the movement of the electrode towards the workpieces, and it need not be tightened or wound up as the electrode is moved away from the workpieces. This also ensures that the strip will always be kept tight, since the winding device too performs the movement of the electrode towards the workpiece and the strip is, thus, prevented in a simple manner from jamming or loosely hanging around.

The configuration according to another embodiment is also advantageous, since thereby the bracket arranged on the base body of the spot welding gun is able to perform a compensation movement towards the workpieces or sheet metals, with the winding device provided for this bracket likewise performing said compensation movement. The exact positioning of the spot welding gun, which is, in particular, devised for robotic applications, is thereby substantially facilitated.

BRIEF DESCRIPTION OF THE DRAWINGS

The present invention will be explained in more detail by way of the accompanying drawings. Therein:

FIG. 3 is a perspective view of a preferably L-shaped bracket having a winding device arranged thereon;

FIG. 4 is a further perspective view of a preferably L-shaped bracket of the spot welding gun according to the invention;

FIG. 5 is a further perspective view of a bracket of the spot welding gun according to the invention;

FIG. 6 is a further perspective view of a bracket of the spot welding gun according to the invention.

DETAILED DESCRIPTION OF PREFERRED EMBODIMENTS

FIGS. 1 to 6 illustrate a spot welding gun 1 for robotic applications for the resistance welding of workpieces 1a, in particular sheet metals, in a perspective view. This is a so-called "C gun", which is, for instance, used for robotic applications in the automotive industry.

Figure 1:
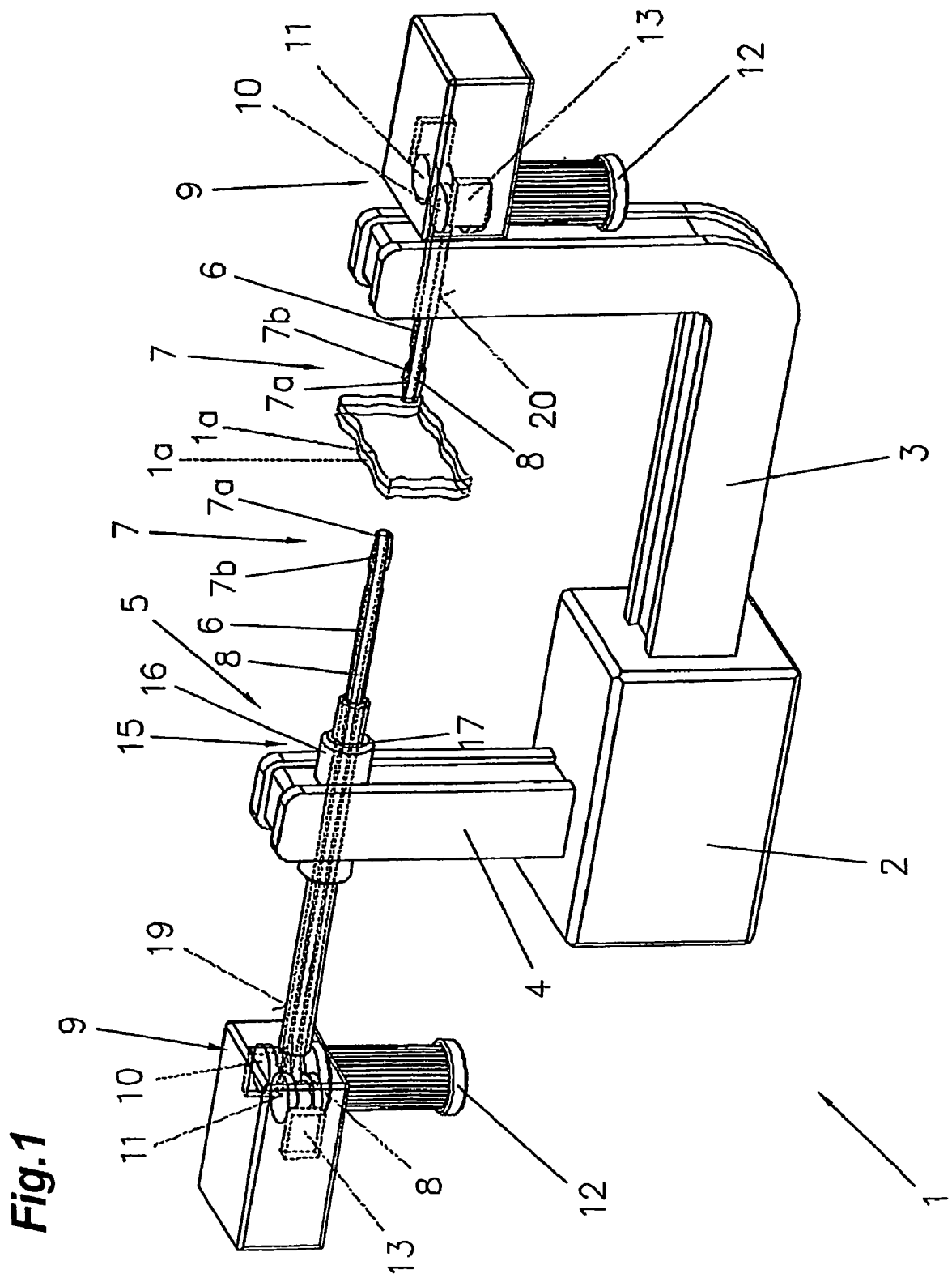
FIG. 1 is a perspective view of a C-shaped spot welding gun according to the invention in the opened state.

The spot welding gun 1 as represented in FIG. 1 is comprised of a base body 2, a bracket 3, a main element 4 and an actuating element 5 fastened to the main element 4, of preferably C-shaped configuration. Electrode holders 6 and electrodes 7 are arranged on the bracket 3 and on the actuating element 5. For the protection of the electrodes 7 is each provided a strip 8, which is arranged between the contact surface of the electrode 7 and the workpiece 1a or sheet metal in a manner displaceable relative to the electrode 7. The strip 8 is guided from a winding device 9 comprised of a wind-off roller 10 and a wind-up roller 11 for the strip 8 to the electrodes 7 or electrode caps and back again to the winding device 9. The winding devices 9 are preferably arranged on the actuating element 5 and on the bracket 3, respectively. It is, of course, also possible to arrange the winding devices 9 in or on the base body 2 rather than on the bracket 3. The wind-off roller 10 and/or the wind-up roller 11 is coupled with a driving means 12 and, in particular, an electronically controllable motor.

Figure 1A:
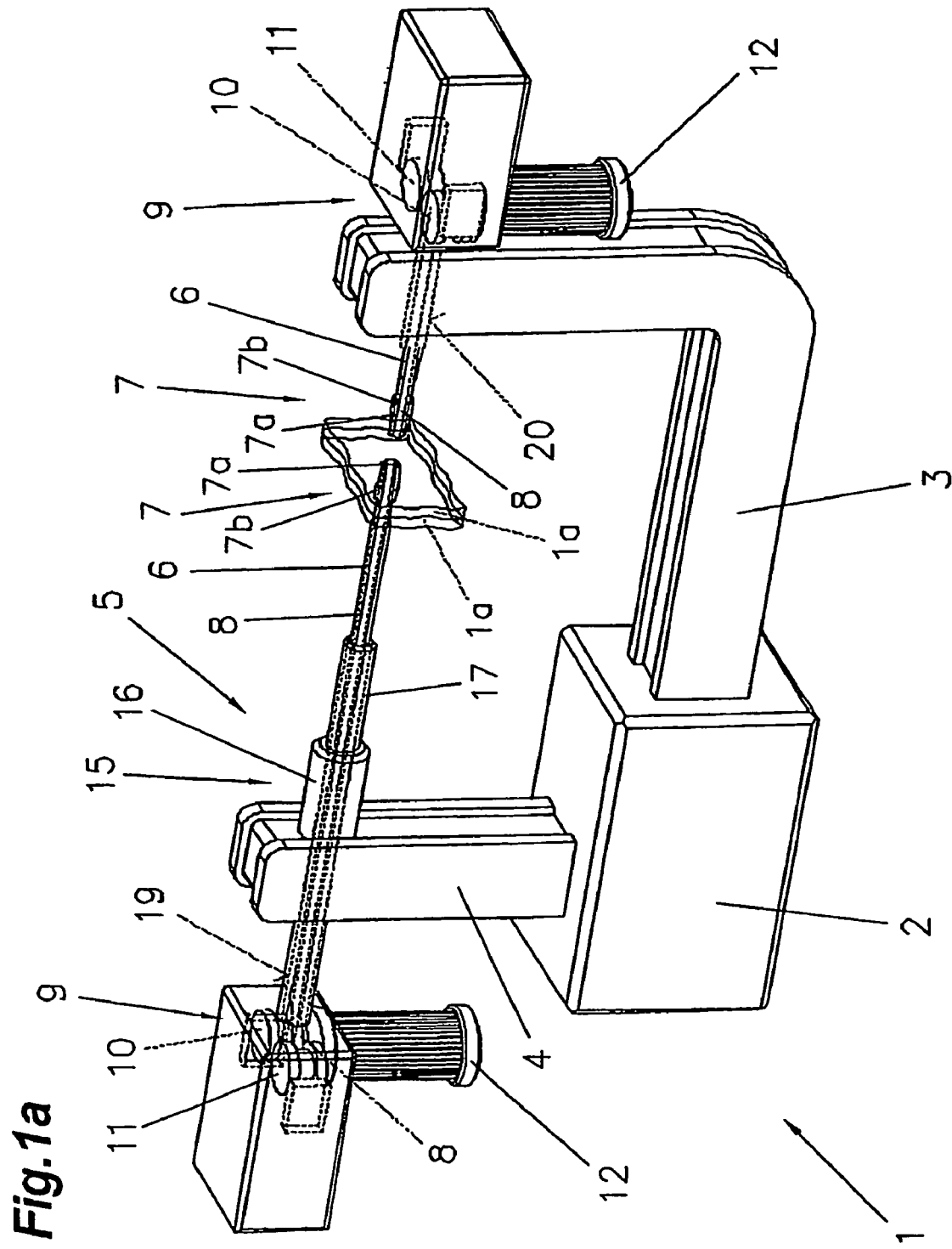
FIG. 1a is a perspective view of the C-shaped spot welding gun according to the invention during spot welding.

The two oppositely arranged electrodes 7 of the spot welding gun 1 are positioned in a spaced-apart relationship to the workpieces 1a, in particular sheets metals, as is schematically illustrated in FIG. 1, whereas in FIG. 1a an electrode 7 of the spot welding gun 1 has already traveled the required displacement path towards the workpieces 1a, in particular sheet metals, with a spot weld being effected on the workpieces 1a. In this case, the electrode 7 arranged on the actuating means 5 has carried out a longitudinal movement or longitudinal displacement relative to the opposite electrode 7 arranged on the bracket 3, and the two electrodes 7, hence, have come to abut against the workpieces 1a. The winding device 9 too has traveled the linear longitudinal displacement path of the electrode 7 arranged on the actuating means 5. It is, thus, ensured that the strip 8 for the protection of the electrode 7 is kept taut, since a full displacement of the winding device 9 is performed together with the electrode 7 and the distance between the winding device 9, or wind-off and wind-up rollers 10, 11, and the electrode 7 or electrode cap, hence, will always remain constant.

As electrodes 7, an assembly especially adapted to the use of the strip 8 is preferably employed. Yet, it is, of course, also feasible to use any other electrode 7 known from the prior art. On the end of the electrode 7 are arranged a spacer 7a and a pressure element 7b, which are connected with the electrode 7 so as to be movable along with the same in the longitudinal direction, said pressure element 7b exerting a force on the spacer 7a. The spacer 7a and the pressure element 7b comprise a guide for the strip 8, wherein the strip 8 is located in a spaced-apart relationship to the electrode 7 above the spacer 7a and the pressure element 7b with the spot welding gun 1 being not closed. This is effected in that the spacer 7a lifts the strip 8 from the electrode surface or electrode cap during or after the opening of the spot welding gun 1 on account of the pressure exerted via the pressure element 7b, whereas the spacer 7a is pushed back against the pressure element 7b during a welding procedure, i.e. with the spot welding gun 1 being closed, so that the electrode 7 or electrode cap will contact the strip 8. In doing so, a pressure or force is exerted by the spacer 7a on the workpiece 1a in addition to the pressure force exerted by the spot welding gun 1 on account of the pressure element 7b so as to prevent, for instance, the process-inherent bending or deflection of the sheet metals or structural components. When using such an electrode 7, or an electrode assembly of this type, it is ensured that the strip 8 is not in direct contact with the electrode cap with the spot welding gun 1 being opened so as to prevent the strip 8 from rubbing against the electrode 7 during its displacement, thus substantially increasing the service life of the electrode 7.

In order to enable the strip 8 to be moved from the winding device 9 to the electrode 7 or electrode assembly, means for guiding and deflecting the strip 8, in particular deflection pulleys and slide surfaces, are arranged on the bracket 3 and/or the main element 4 and/or the electrode holder 6.

Figure 2:
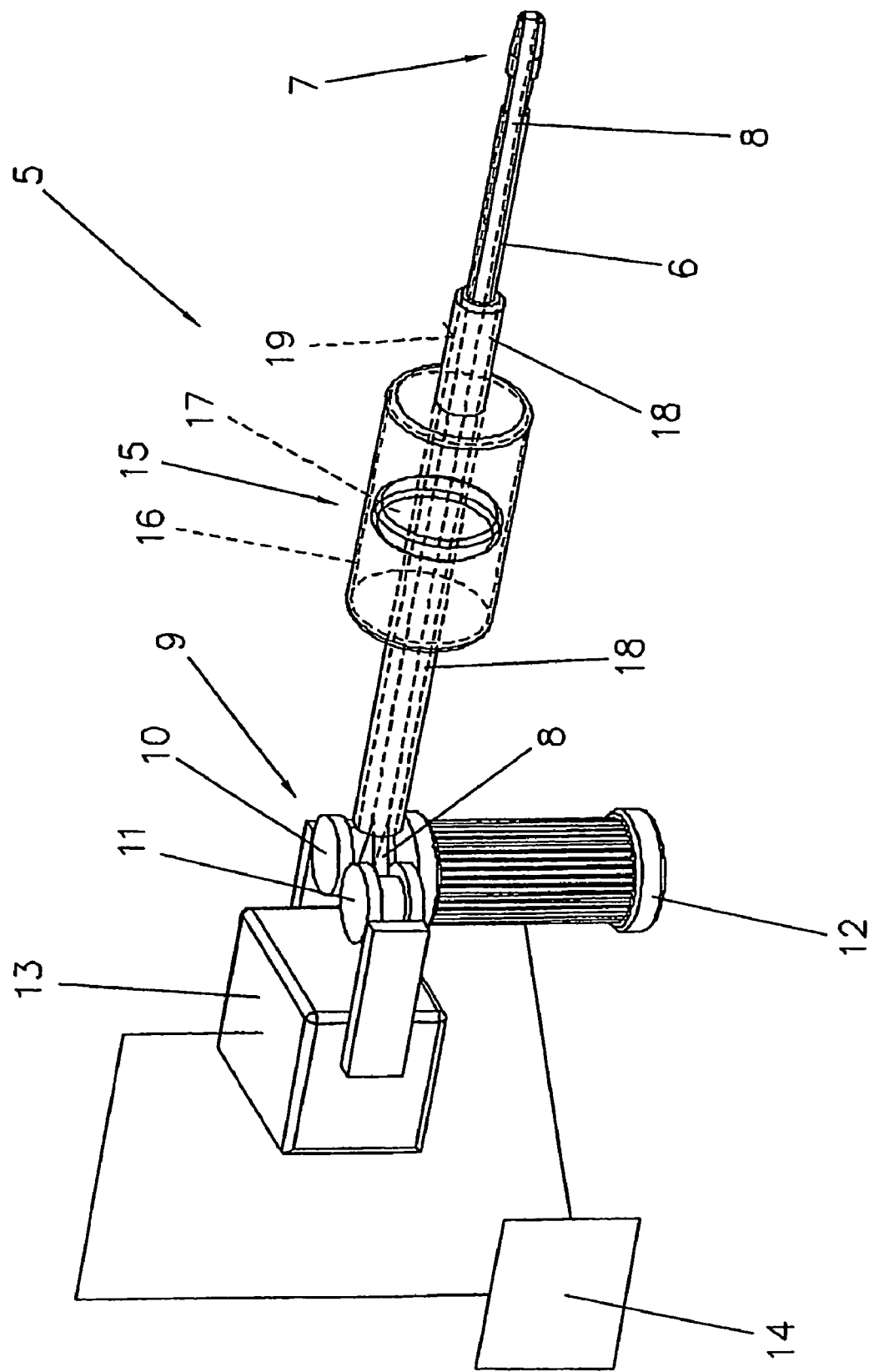
FIG. 2 is a perspective view of an actuating element of the spot welding gun according to the invention.

A braking device 13 for the strip 8 may be arranged in the region of the wind-off roller 10 and/or wind-up roller 11, which braking device is controllable by a control device 14, as is apparent from FIG. 2. It is thereby reached that the strip 8 is held tight so as to prevent the strip 8 from jamming or loosely hanging within a bore or guiding groove. The braking device 13 is preferably integrated in the winding device 9. There is no detailed illustration, because the design may be manifold. The braking device 13 might, for instance, be formed by two relatively movable pressure elements between which the strip 8 is guided and which are moved onto the strip 8 with the braking device 13 activated, thus fixing the strip 8. The task of the braking device 13, therefore, consists in fixing the strip 8 after a further movement of the strip 8 so as to keep the strip 8 always tight. The winding device 9 is devised to enable the simple and uncomplicated exchange or replacement of the wind-off roller 10 and wind-up roller 11, or of the strip 8.

Another positive effect of the arrangement of the wind-off roller 10 and wind-up roller 11 consists in that, due to the strip 8 being guided from behind, i.e., from the base body 2 and/or the bracket 3 and from the main element 4 or actuating element 5, respectively, to the electrode 7, no interfering elements or parts are present, which, as a result, allows for the nearly problem-free realization of a spot weld even with workpieces 1a that are difficult to accede, because there is no limited accessibility relative to a welding gun having no strips 8. This configuration further enables the structural dimensions of the spot welding gun 1 to be kept small and, hence, also the weight to be reduced.

The actuating means 5 is comprised of a hydraulic, pneumatic or electromotorically controllable drive such as, for instance, a cylinder 15. The cylinder 15 is preferably comprised of a cylinder jacket 16 and a piston 17, through which a piston rod 18 passes. The piston rod 18, which passes through the whole cylinder 15, is positively connected with the piston 17, i.e., the piston rod 18 projects from the cylinder 15 on either side such that elements may be attached to both projecting sides of the piston rod 18 in order to impart the moving process of the piston rod 18 to the same. The piston 17 is arranged within the cylinder 15 in a manner that the piston 17 is guided along a longitudinal axis of the cylinder 15 to define the stroke of the spot welding gun 1 for tacking sheet metals. The electrode holder 6 for the electrode 7 is arranged on the piston rod 18, the electrode holder 6 and the electrode 7 again comprising means, in particular sliding surfaces, for guiding the strip 8. The electrode 7 and electrode holder 6, respectively, are arranged on that side of the cylinder 15, which is associated with the workpiece 1a or the further electrode 7 arranged on the bracket 3, respectively. Moreover, the winding device 9 is fastened to the piston rod 18 directly or via a guiding element on the cylinder side located opposite the electrode 7. The winding device 9 is, thus, adjustable via the piston rod 18 of the actuating means 5 together with the wind-off and wind-up rollers 10, 11. The winding device 9, thus, follows the stroke of the actuating element 5, which renders the deflection or tightening of the strip 8 superfluous.

Furthermore, the piston rod 18 has a bore 19 extending axially through the piston rod 18. The bore 19 is formed to constitute a guide for the strip 8 through the piston rod 18. The strip 8 for the protection of the electrode 7, hence, extends from the wind-off roller 10 axially through the bore 19 provided in the piston rod 18 to the electrode 7 or electrode cap and, on the opposite side, again axially through the bore 19 provided in the piston rod 18 back to the wind-up roller 11. This special fixation of the winding device 9 is obtained in that, during the execution of a stroke, the distance or position of the wind-off and wind-up rollers 10, 11 relative to the electrode 7 or electrode cap will always remain the same and the strip 8 will, hence, always be tight and never be loosely guided.

Moreover, a further winding device 9 is arranged on the bracket 3 for the protection of the further electrode 7. It is, for instance, rigidly fastened to the bracket 3 on the outer side, or side located opposite the electrode, of the bracket 3, as is apparent from FIG. 3. The bracket 3 again comprises guides or a bore 20 arranged in an axial relationship to the electrode 7 and through which the strip 8 is guided to the electrode 7. The strip 8 for the protection of the electrode 7, thus, extends from the wind-off roller 10 arranged in the winding device 9 axially through the bore 20 provided in the bracket 3 to the electrode 7 or electrode cap and, on the opposite side, again axially through the bore 20 to the wind-up roller 11.

It is, of course, also possible to arrange a further actuating means 5, for instance, on the bracket 3. This enables a compensation movement of the spot welding gun, in particular C gun, to be carried out relative the workpiece 1a, as is indicated in FIG. 4. The actuating element 5 in this case is comprised of a cylinder 15, with a piston 17 and a piston rod 18 positively connected with the former being arranged within the cylinder 15. It is also feasible to form the actuating element 5 by a hydraulically or pneumatically controllable cylinder 15, or of an electromotoric drive. In this case, the configuration or design of the actuating means 5 for the bracket 3 may be identical with the configuration or design of the actuating means 5 for the main element 4. It should basically be mentioned that the compensation movement of the bracket 3, or the electrode 7 arranged thereon, in a robotic application serves to preposition the spot welding gun 1 and, in particular, C gun by the robot, whereupon the bracket 3 is moved towards the workpiece 1a by the compensation movement and the opposite electrode 7 provided on the actuating element 5 is subsequently likewise positioned at the workpiece 1a by the longitudinal movement.

It is, furthermore, feasible to realize the compensation movement of the spot welding gun 1 for the bracket 3 in a manner that the whole bracket 3 is displaced such that the actuating means 5 on the bracket 3 may be omitted, as previously described by way of FIG. 3. To this end, the bracket 3 is mounted to be displaceable via the actuating means 21 arranged in the base body 2, as is schematically illustrated in FIG. 5. The winding device 9 in this exemplary embodiment is fixedly arranged on the bracket 3 in an axial plane relative to the electrode 7. The winding device 9 is, thus, automatically moved along with the bracket 3 at a compensation movement of the latter, which constitutes a substantial simplification in terms of structure.

FIG. 6 depicts an exemplary embodiment in which the winding device 9 is arranged in the base body 2 on the bracket 3 such that the winding device 9 is again able to carry out the compensation movement along with the bracket 3. To this end, a channel or guide 22 is provided in the bracket 3, in which the strip 8 extends from the wind-off roller 10 arranged in the winding device 9 along the bracket 3 to the electrode holder 6 and the electrode 7 and back again to the wind-up roller 11.

Figure 7:
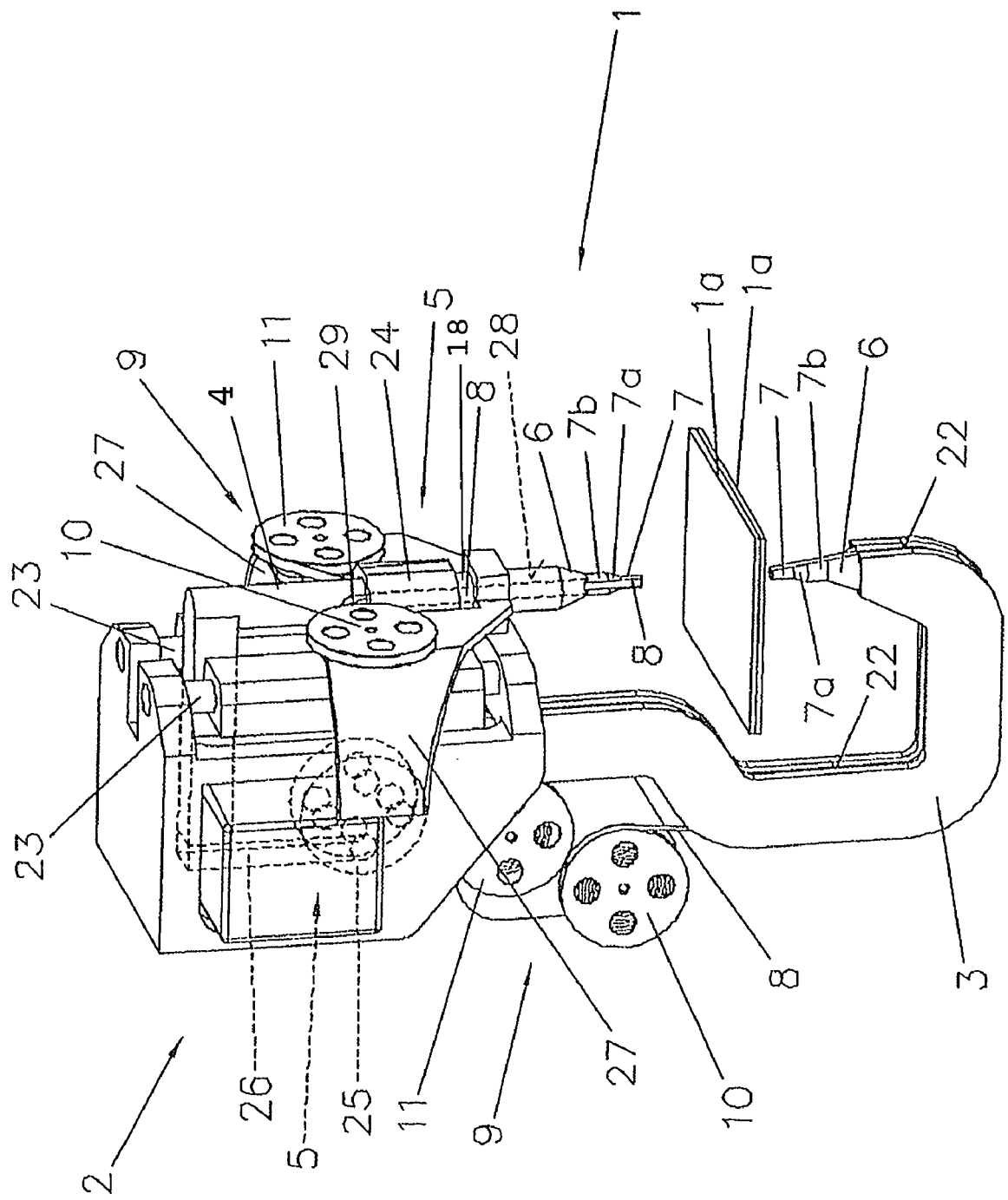
FIG. 7 is a schematic perspective view of a further embodiment of a spot welding gun.

Another exemplary embodiment of the C gun according to the invention is illustrated in FIG. 7. The C gun in this case is comprised of the base body 2, in which a guide element 23 is arranged, on which the preferably C-shaped bracket 3 is mounted. The compensation movement for the bracket 3 can now be performed by the aid of an actuating means 5 not illustrated, whereby the bracket 3 is displaced along the guide element 23. The winding device 9 in the exemplary embodiment illustrated is arranged in the region of the base body 2 on the bracket side located opposite the electrode 7, thus being displaced along with the bracket 3 during the compensation movement of the latter. The guidance of the strip 8 in this case is effected via channels or guides 22 along the bracket 3 as far as to the electrode 7, as has already been explained in detail by way of the previously described Figures.

Moreover, the main element 4, to which the further electrode 7 as well as an electrode holder 6 are fastened, is displaceably arranged on the base body 2 via a further guide element 24. In order to enable a displacement or a defined contact pressure for the spot welding procedure on the workpiece 1a, a further actuating element 5 is arranged in the base body 2, as is schematically indicated by broken lines. The actuating element 5 in this case is, for instance, designed as a crank drive 25 with the main element 4 being displaced via a connecting rod 26. As is apparent from the illustrated example, the winding device 9, in particular the wind-off and wind-up rollers 10, 11, are arranged on a cover 27. The cover 27 is directly mounted on the main element 4, thus following the movement of the main element 4. It is feasible to fasten the cover 27 in front of or behind the guide element 24, wherein an appropriate strip guidance should be provided in any event. The main element 4, for instance, comprises an axial bore 28 and an opening 29 communicating with the bore 28, the function of which is to direct the strip 8 via the opening 29 and the bore 28 through the guide 24 in a manner that the strip 8 and the winding device 9 follow the displacement of the main element 4, as the latter is being displaced. The strip 8, thus, runs through the guide 24 to the winding device 9.

In the exemplary embodiment illustrated, the main element 4 is designed as a piston rod 18 and the guide element 24 as a cylinder 15. It can, thus, be said that the mode of functioning of the exemplary embodiment illustrated corresponds with the preceding exemplary embodiments, which means that, due to the guidance of the strip 8 within the bore 28 provided in the main element 4, the winding device 9 will again be simultaneously displaced at a displacement of the main element 4 relative to the guide element 24, yet with the strip 8 remaining tight all the time. With such a spot welding gun 1, it is essential that the winding device 9 follows the displacement path simultaneously with the movable, guided parts. It is thereby ensured that the distance between the electrode 7 or electrode cap and the winding device 9 will always remain constant without any excess strip 8 forming. In a simplified manner, this is obtained in that the strip 8 in the event of bearings, guide means, cylinder designs etc. extends axially in the center through a guide or groove.

It should basically be mentioned that the spot welding gun 1 according to the invention is, for instance, positioned by a robot at a workpiece 1a. Following the positioning by the robot, the spot welding gun 1 will perform a compensation movement in the direction of the workpiece 1a by means of the bracket 3, which is displaceably mounted within the base body 2. This movement is triggered and controlled by a control device 14, which is, however, not illustrated. After contacting between the electrode 7 arranged on the bracket 3 on the electrode holder 6 and the workpiece 1a, the spot welding process proper is carried out. To this end, the electrode holder 6, which is arranged to be displaceable with the main element 4, is moved with the electrode 7 arranged thereon in the direction of the workpiece 1a until contacting the workpiece 1a. Since the spot welding process constitutes a welding process known from the prior art, the subsequent procedure is not described in detail.

What is claimed is:

1. A spot welding gun (1) for resistance welding of workpieces (1a), including a base body (2), a bracket (3) having a C-shaped configuration, a main element (4) displaceably arranged on the base body, a first guide element (23) arranged on the base body for performing compensation movement for the bracket, whereby the bracket is displaced along the first guide element, a second guide element (24) for displacement of the main element, and electrode holders (6) carrying electrodes (7) arranged on the bracket, each electrode having a respective spacer and a respective pressure element arranged on an end of the electrode, each respective spacer and respective pressure element being connected with the electrode so as to be movable along with the electrode in a longitudinal direction, the pressure element exerting a force on the spacer, wherein at least one electrode holder (6) is fastened to an actuating means (5) via which the electrode holder (6) fastened thereto is displaceable together with one of said electrodes (7) in the longitudinal direction to a further one of said electrodes (7), wherein a winding device (9) including an associated strip (8) is each provided for the protection of an associated electrode of the electrodes (7), one winding device being arranged on the bracket (3) mounted on the base body (2) and another winding device being arranged on the actuating means (5), each strip (8) being arranged to be displaceable relative to the associated electrode (7) between the contact surface of the electrode (7) and a workpiece (1a), and wherein the winding device (9) associated with the displaceable electrode (7) is connected with the displaceable electrode (7) so as to follow a longitudinal movement of said electrode (7), wherein each spacer and pressure element form a respective guide for the strip, wherein the strip is located in a spaced apart relationship to the electrode above the spacer and the pressure element with the spot welding gun being not closed, wherein the spacer lifts the strip from an electrode surface or an electrode cap during or after opening of the spot welding gun on account of the pressure exerted via the pressure element, whereas the spacer is pushed back against the pressure element during a welding procedure with the spot welding gun being closed, so that the electrode or electrode cap will contact the strip, wherein a pressure or force is exerted by the spacer on the workpiece in addition to the pressure force exerted by the spot welding gun on account of the pressure element, and wherein the electrode holders (6) and the electrodes (7) comprise means for guiding the strip (8) from the winding device (9) axially along the electrode holder (6) to the electrode (7) and again axially along the electrode holder (6) back to the winding device (9).

2. A spot welding gun (1) according to claim 1, wherein each winding device (9) comprises a wind-off roller (10) and a wind-up roller (11) for the guidance of the associated strip (8) to the associated electrode (7) and back again to the winding device (9).

3. A spot welding gun (1) according to claim 2, wherein the wind-off roller (10) and/or the wind-up roller (11) are coupled with a driving means (12).

4. A spot welding gun (1) according to claim 3, wherein the driving means (12) comprises an electronically controllable motor.

5. A spot welding gun (1) according to claim 2, wherein a braking device (13) is provided for each strip (8) to keep the strip (8) tight.

6. A spot welding gun (1) according to claim 5, wherein the braking device (13) is controllable by a control device (14).

7. A spot welding gun (1) according to claim 1, wherein the actuating means (5) comprises a hydraulically, pneumatically or electromotorically controllable drive.

8. A spot welding gun (1) according to claim 7, wherein the controllable drive comprises a cylinder (15) comprising a cylinder jacket (16), a piston (17) and a throughgoing piston rod (18), wherein the winding device (9) together with the strip (8) is adjustable via the piston (17) and the throughgoing piston rod (18), respectively.

9. A spot welding gun (1) according to claim 8, wherein the piston rod (18) comprises a guide or bore (19) which is provided axially to the piston rod (18) for guiding the strip (8).

10. A spot welding gun (1) according to claim 9, wherein the strip (8) for the protection of the electrode (7) extends from the wind-off roller (10) axially through a bore (19) provided in the piston rod (18) to the electrode (7) and, on the opposite side, again axially through the bore (19) provided in the piston rod (18) to the wind-up roller (11).

11. A spot welding gun (1) according to claim 8, wherein the winding device (9) arranged on the actuating means is arranged on the piston rod (18) on the side opposite the electrode (7).

12. A spot welding gun (1) according to claim 1, wherein the winding device (9) is rigidly arranged on the bracket (3).

13. A spot welding gun (1) according to claim 12, wherein the bracket (3) comprises a bore (20) provided axially to the electrode (7) for guiding the strip (8).

14. A spot welding gun (1) according to claim 12, wherein the winding device (9) arranged on the bracket (3) is arranged on the side opposite the electrode (7).

15. A spot welding gun (1) according to claim 13, wherein the strip (8) for the protection of the electrode (7) extends from the wind-off roller (10) axially through a bore (20) provided in the bracket (3) to the electrode (7) and, on the opposite side, again axially through the bore (20) provided in the bracket (3) to the wind-up roller (11).

16. A spot welding gun (1) according to claim 12, wherein a further actuating element (5) is arranged on the bracket (3), via which the electrode holder (6) fastened thereto, together with the electrode (7), is displaceable in the longitudinal direction to the further electrode (7).

17. A spot welding gun (1) according to claim 16, wherein the actuating element (5) comprises a cylinder (15) and a piston (17) as well as a piston rod (18) positively connected with the former are arranged within the cylinder (15).

18. A spot welding gun (1) according to claim 12, wherein the bracket (3) is arranged to be displaceable via an actuating means (21) arranged in the base body (2).

* * * * *